Sept. 5, 1967 KUNIO ONO 3,340,466
HIGH-FREQUENCY AND LOW-FREQUENCY NONDESTRUCTIVE TESTERS
UTILIZING EDDY CURRENTS TO TEST FOR SURFACE
AND SUB-SURFACE DEFECTS
Filed April 9, 1963
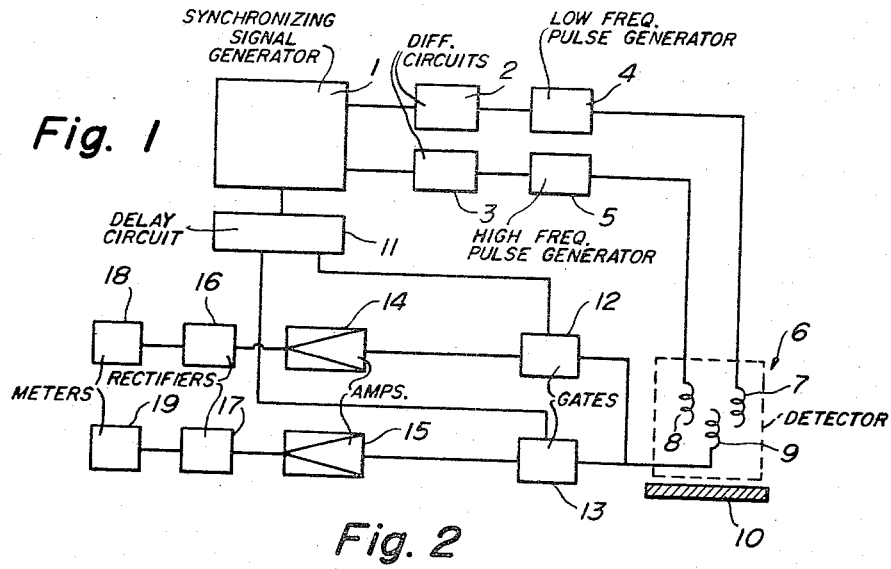
Fig. 1
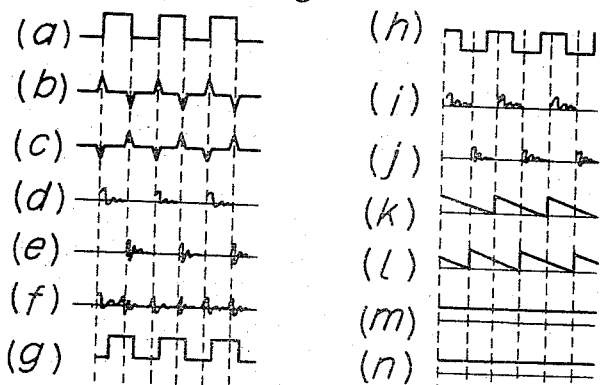
Fig. 2
Fig. 3
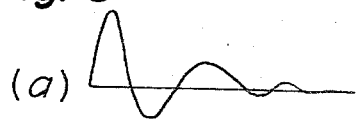
(a)
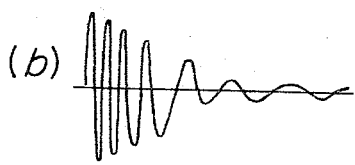
(b)
Fig. 4
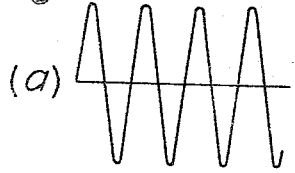
(a)
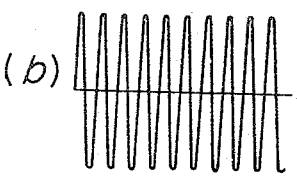
(b)
INVENTOR
Kunio Ono
By Paul M. Craig, Jr.
ATTORNEY

United States Patent Office 3,340,466
Patented Sept. 5, 1967

3,340,466
NONDESTRUCTIVE TESTERS UTILIZING HIGH-FREQUENCY AND LOW-FREQUENCY EDDY CURRENTS TO TEST FOR SURFACE AND SUB-SURFACE DEFECTS
Kunio Ono, Hitachi-shi, Japan, assignor to Hitachi, Ltd., Tokyo, Japan, a corporation of Japan
Filed Apr. 9, 1963, Ser. No. 271,640
Claims priority, application Japan, Apr. 12, 1962, 37/13,796
6 Claims. (Cl. 324—40)

The present invention relates to nondestructive testers or metal defect testing devices utilizing eddy currents which are useful in the detection of surface or sub-surface discontinuities or defects in metal objects, and is intended to overcome various difficulties encountered in conventional nondestructive testers of this type.

The invention has for its object to provide an improved nondestructive tester which employs high-frequency and low-frequency eddy currents to test nondestructively for surface and sub-surface defects in a specimen, and employs a novel gated output channel which is substantially free from noise effects so that it gives ready and correct interpretation of the defect signal obtained.

Nondestructive testers utilizing eddy currents are used to test various types of electroconductive material for structural and other defects possibly occurring therein. In such a tester, a coil for forming an alternating magnetic field is placed in proximity to the electroconductive object to be tested to cause eddy currents therein. The magnitude of eddy currents or their distribution in the electroconductive object varies with any flaw or defect in the material or other factors affecting its electromagnetic properties and such variation is utilizable to detect the flaw.

With previous testers of this kind, it has been necessary to conduct separate measurements for surface and sub-surface defects due to the difficulty encountered in separating the two types of signals, and preventing the superposition of background noise thereon. In practice, it is very important to clearly discriminate the desired defect signal from a background noise signal originating in the space between the object under examination and the coil causing eddy currents therein. Also, there is a need to know whether the flaw is in the surface or interior of the object under examination, and to separate these types of signals from each other. In the past these requirements have necessitated elaborate frequency sensitive schemes which are expensive and cumbersome to operate. The present invention has been devised to overcome these shortcomings and to provide a simple and relatively inexpensive apparatus for obtaining the desired type of measurement.

The foregoing and other objects, features and advantages of the invention will become apparent from the following description when taken in conjunction with the accompanying drawing, in which:

FIG. 1 is a block diagram of one embodiment of the invention;

FIG. 2 is an explanatory diagram illustrating various waveforms as appearing in the embodiment of FIG. 1;

FIG. 3 illustrates a low-frequency and a high-frequency damped oscillatory pulse used in the tester; and FIG. 4 illustrates a low-frequency and a high-frequency undamped oscillatory pulse used in the tester.

Referring first to FIG. 1, the tester circuitry illustrated includes a rectangular synchronizing clock signal generator 1, a first differentiation circuit 2, a second differentiation circuit 3 the output pulse of which is reversed in phase relative to that of the first circuit, a first pulse generator 4 responsive solely to the positive pulses in the output of the first differentiation circuit 2 to fom low-frequency damped oscillatory pulses, a second high-frequency pulse generator 5 responsive solely to the positive pulses in the output of the second differentiator 3 to form high-frequency damped oscillatory pulses, and a detector 6.

The detector 6 includes a first coil 7 for forming eddy currents in response to the low-frequency output of the first pulse generator 4, a second coil 8 for forming eddy currents in response to the high-frequency output of the second pulse generator 5, and a detecting coil 9 for detecting the magnetic field formed by the eddy currents caused in the object 10 under examination. The tester further includes a delay circuit 11 adapted to produce output pulses delayed in phase by a predetermined amount relative to those from the signal generator 1. A pair of gate circuits 12 and 13, have their inputs connected in common to the detecting coil 9, and have their outputs connected through amplifiers 14 and 15, respectively, and rectifier circuits 16 and 17, respectively, to recording instruments 18, 19, respectively, for recording or indicating the output signal derived by detector 6. The control elements of gate circuits 12 and 13 are connected to the output of delay circuit 11. The gating signals applied to gate circuits 12 and 13 are phased so that the gate circuit 12 is operable to allow passage only of the low-frequency component of the output signal from the detector 6, while the other gate circuit 13 is operable to allow passage only of the high-frequency component of the detector output.

The operation of the above tester will be described with reference to the waveform diagram of FIG. 2.

To begin with, the circuit 1 in FIG. 1 forms rectangular pulses as shown in FIG. 2(a). The pulse wave is differentiated in the next circuit 2 to obtain the waveform of FIG. 2(b), which is applied to the low-frequency pulse generator 4 to form pulses of low frequency as illustrated in FIG. 2(d). FIG. 3(a) illustrates one of the low frequency pulses of FIG. 2(d) on an enlarged scale. The pulses of FIG. 2(d) are applied to the first eddy-forming coil 7.

The circuit 3 forms pulses similar to those formed by cricuit 2 but reversed in phase relative to the latter, as illustrated in FIG. 2(c). The pulses are impressed upon the high-frequency pulse generator 5 to be converted into high-frequency damped oscillatory pulses as shown in FIG. 2(e) which are applied to the second eddy-forming coil 8. FIG. 3(b) shows one of the high-frequency pulses of FIG. 2(e) on an enlarged scale. As will be observed, the high-frequency damped oscillatory pulses of FIG. 2(e) are shifted in time relative to the low-frequency pulses of FIG. 2(d). Thus, the low-frequency and high-frequency damped oscillatory pulses are alternately impressed upon the respective eddy current-forming coils 7 and 8. Therefore, the magnetic fields formed by the coils 7 and 8 cooperate to form alternately low-frequency and high-frequency eddy currents in the object 10 being tested. The detector coil 9 is thus placed in an oscillatory magnetic field formed by the low-frequency eddy currents alternating with those formed by the high-frequency eddy currents, as seen in FIG. 2(f) to give an output corresponding to such field. It will be understood that the detector coil 9 may be an unitary or a differential coil.

The output signal from the detector coil 9 is separated into its low-frequency and high-frequency components by gate circuits 12 and 13. The gate circuits 12, 13 operate under control of respective rectangular pulses (g) and (h) in FIG. 2. As observed, these rectangular pulses are delayed relative to the output of the synchronizing signal generator 1 (FIG. 2(a)) by the delay circuit 11. It is to be understood that the gate circuits 12 and 13 each function to allow passage of only those oscillatory pulses which arrive from the detector when the output voltage of the delay circuit being impressed upon the respective gate circuits is at the lower level. The waveforms (*i*) and (*j*) in FIG. 2 thus represent the respective outputs of the gate circuits 12 and 13, which are impressed upon the amplifiers 14 and 15, respectively. The first rectifier circuit 16 demodulates and rectifies the output of the amplifier 14. Waveforms (*k*) and (*m*) in FIG. 2 respectively represent the demodulated pulses and the output of the rectifier 16. The second rectifier circuit 17 demodulates and rectifies the output of the amplifier 15. Waveforms (1) and (*n*) respectively represent the demodulated pulses and the output of the rectifier 17. The outputs of the rectifiers are led to the respective recording instruments 18 and 19. In the presence of some defect in the object 10 under examination, a record will be obtained which has a peak corresponding to the defect, as will readily be understood.

Low-frequency and high-frequency damped oscillatory pulses as illustrated in FIG. 3 can be obtained with ease by suddenly applying a pulsed direct-current voltage to an appropriate LC resonance circuit. In this case, the frequency of oscillation obtained is substantially the same as the resonance frequency of the LC circuit, as is well known in the art. It is also a known fact that, where two signals, one of low frequency and the other of high frequency, are applied to the object being tested, the high-frequency signal is effective to detect any defect occurring in the object particularly in the vicinity of its surface while the low-frequency signal is effective to detect any flaw occurring in the depth of the object.

Accordingly, in use of the tester described above, in which two defect signals are separately obtained through high-frequency and low-frequency damped oscillatory pulses, any higher peak observed on the high-frequency recorder 19 than on the low-frequency recorder 18 indicates some defect occurring in the object 10 in the vicinity of its surface while any higher peak on the low-frequency side recorder 18 indicates some defect in the depth of the object being tested, as will readily be appreciated.

Though an embodiment employing damped oscillatory pulses has been described hereinbefore, undamped oscillatory pulses as shown in FIG. 4 may also be utilized with success in thi invention. As will readily be appreciated, use of the damped oscillatory pulses reduces the temperature rise of the coils, although use of the undamped oscillatory pulses enables the detector coil 9 to carry a substantially increased current for a limited period of time to obtain a greater detector output.

In addition, though in FIG. 1 the detector coil 9 is positioned above the object 10 to be tested, the object may be inserted into the detector coil 9. Also, in case the object is hollow the detector coil 9 may be inserted therein. Further, in place of the two respective coils 7 and 8 shown in FIG. 1 a single eddy-forming coil may be employed as long as the high-frequency and low-frequency oscillatory pulses impressed thereon are shifted in time relative to each other.

To summarize, in the tester of the invention the output of a synchronizing signal generator is utilized to form phase shifted high-frequency and low-frequency oscillatory pulses, which in turn form respective magnetic fields by way of eddy-forming coil means to be alternately applied to the object under examination to cause eddy currents to flow therein. The varying magnetic field formed by such eddy currents is detected by a detector coil, the output signal of which is conducted to a pair of gate circuits operable under control of a delayed gating pulse signal coming from the said signal generator by way of a delay circuit. The detector output can thus be separated into two series of high-frequency and low-frequency oscillatory pulses due to their differing phase relation.

As a consequence, an important advantage of the invention is that the frequency of the high-frequency and low-frequency oscillatory pulses to be applied to the object to be tested can be freely selected in accordance with the thickness, type of material and other factors of the object.

Another advantage of the invention is that any adverse effects of noise originating in the space between the object being tested and the eddy-forming coil means can be effectively avoided by comparison between the high-frequency and low-frequency components of the output signal of the detector. A further important advantage is that defects occurring in the object in the vicinity of its surface can be effectively detected by the information signal obtained through the medium of high-frequency oscillatory pulses and any defects in the depth of the object are detected by the information obtained through the medium of low-frequency oscillatory pulses.

Having shown and described one embodiment of the invention and suggested various modifications thereof, it is to be understood that these are not intended to be exhaustive nor limiting of the invention, but the invention is designed or comprehended within the full scope of the invention as claimed and consistent with the prior art.

What is claimed is:

1. A nondestructive tester utilizing eddy currents comprising a synchronizing signal generator for generating a synchronizing clock signal, first means for generating a first series of pulsed high-frequency oscillatory signals in response to the output of said signal generator, second means for generating a second series of pulsed low-frequency oscillatory signals, said second series of pulsed low-frequency oscillatory signals being shifted in phase by a predetermined amount relative to said first series of pulsed high-frequency oscillatory signals in response to the output of said synchronizing signal generator, coil means inductively coupled with an object under examination for inducing eddy currents therein in response to said pulse high-frequency and low-frequency oscillatory signals, detecting means for detecting the magnetic field formed by said eddy currents caused in the object, a delay circuit operatively coupled to the output of the signal generator for producing an output gating signal of similar waveform but delayed in phase relative to the first mentioned output of said signal generator, a pair of gate circuits controlled by the output of said delay circuit and coupled to the detecting means to allow passage of the high-frequency and low-frequency components of the output of said detecting means in controlled fashion, and means for enabling observation of the respective outputs of said gate circuits.

2. A nondestructive tester utilizing eddy currents comprising a synchronizing signal generator for generating a synchronizing pulse signal of rectangular waveform, first means for generating a first series of pulsed high-frequency damped oscillatory signals in response to the output of said signal generator through differentiation thereof, second means for generating a second series of pulsed low-frequency damped oscillatory signals, said second series of pulsed low-frequency oscillatory signals being shifted in phase by a predetermined amount relative to said first series of pulsed high-frequency damped oscillatory signals in response to the output of said synchronizing signal generator, coil means inductively coupled with an object tested for causing eddy currents therein in response to said pulsed high-frequency and low-frequency damped oscillatory signals, a detecting coil for detecting the magnetic field formed by said eddy currents caused in the object, a delay circuit operatively coupled to an output from the signal generator for producing an ouput signal of similar waveform but delayed in phase relative to the first mentioned output of said synchronizing signal generator, a pair of gate circuits controlled by the output of said delay circuit and having their inputs coupled to the detecting coil to allow passage of the high-frequency and low-frequency components of the output of said detecting coil in controlled fashion, amplification and rectification means coupled to the output of each of said gate circuits, and means for enabling observation of the respective outputs of said amplification and rectification means.

3. A metal defect testing device using eddy currents, comprising:

synchronizing signal generating means for generating synchronizing signals, first pulse generator means operatively coupled with said synchronizing signal generating means synchronized thereby for generating a first set of pulsed high-frequency oscillatory signals, second pulse generator means operatively coupled with said synchronizing signal generating means and synchronized thereby for generating a second set of pulsed low-frequency oscillatory signals, said second set of pulsed low-frequency oscillatory signals being shifted in time with respect to the first set of pulsed high-frequency oscillatory signals, first coil means operatively coupled with said first and second pulse generators means and inductively coupled with said metal being tested for causing eddy currents therein, second coil means inductively coupled with said metal for detecting said eddy currents caused therein, indicating means, selectively operable gating means operatively coupled to said second coil means and controlled by said synchronizing signal generating means for selectively passing to said indicating means output signals derived from the first set of pulsed high-frequency oscillatory signals and the second set of pulsed low-frequency oscillatory signals, and delay circuit means operatively coupled intermediate said synchronizing signal generating means and said gating means whereby said gating means is selectively made operable alternately in accordance with a signal delayed in phase relative to the synchronizing signals supplied to the first and second pulse generator means.

4. A metal defect testing device according to claim 3, in which said gating means comprises a pair of gate means, one for each set of pulsed high frequency and low frequency oscillatory signals, said indicating means includes first and second indicating means each operatively connected to the output of one of said pair of gate means, respectively.

5. A metal defect testing device according to claim 3, in which said first pulse generator means includes a high-frequency signal generator and the second pulse generator means includes a low-frequency signal generator with at least one of said generators having the frequency of operation thereof selected in accordance with the physical and material characteristics of the object to be tested.

6. A metal defect testing device according to claim 4, in which said first pulse generator means includes a high-frequency signal generator and the second pulse generator means includes a low-frequency signal generator with each of said generators having the frequency of operation thereof selected in accordance with the physical and material characteristics of the object to be tested.

References Cited
UNITED STATES PATENTS

| | | | |
|---|---|---|---|
| 1,946,196 | 2/1934 | Drake et al. | 324—37 |
| 2,744,233 | 5/1956 | Paivinen | 324—34 |
| 2,817,832 | 12/1957 | Mathes | 343—13 |
| 2,965,840 | 12/1960 | Renken et al. | 324—40 |
| 3,229,197 | 1/1966 | Renken | 324—40 |

OTHER REFERENCES

McGonnagle, W. J., et al.: Improved Nondestructive Testing by Eddy Currents, Electronics, Aug. 28, 1959, pp. 42–43.

RUDOLPH V. ROLINEC, *Primary Examiner.*

RICHARD B. WILKINSON, WALTER L. CARLSON, *Examiners.*

R. J. CORCORAN, *Assistant Examiner.*